United States Patent [19]
Jansen et al.

[11] Patent Number: 5,580,425
[45] Date of Patent: Dec. 3, 1996

[54] COLUMN FOR OVERHEATED LIQUIDS

[75] Inventors: Helmut Jansen, Dormagen; Jochen Leben, Düsseldorf; Thomas Rietfort, Bottrop; Egon Zich, Leichlingen, all of Germany

[73] Assignee: Julius Montz GmbH, Hilden, Germany

[21] Appl. No.: 330,710

[22] Filed: Oct. 28, 1994

[30] Foreign Application Priority Data

Oct. 29, 1993 [DE] Germany .......................... 43 36 984.7

[51] Int. Cl.⁶ ................................ B01D 3/14; B01D 11/02
[52] U.S. Cl. .................... 202/158; 202/197; 203/DIG. 6; 261/DIG. 72; 422/272; 422/275; 422/278
[58] Field of Search ...................... 202/158, 197; 203/DIG. 6; 261/DIG. 72; 422/257, 272, 275, 278

[56] References Cited

U.S. PATENT DOCUMENTS

| | | | |
|---|---|---|---|
| 3,017,950 | 1/1962 | Koshoot | 202/158 |
| 3,083,148 | 3/1963 | Mojonnier | 202/158 |
| 3,163,685 | 12/1964 | Gaede | 202/158 X |
| 4,230,533 | 10/1980 | Giroux | 203/1 |
| 4,440,601 | 4/1984 | Katz et al. | 203/24 |
| 4,591,413 | 5/1986 | Peterson | 202/173 |
| 4,919,257 | 4/1990 | Brigham, Sr. et al. | 202/158 |
| 5,034,103 | 7/1991 | Hamer et al. | 202/158 |
| 5,096,543 | 3/1992 | Elmore | 202/172 |
| 5,326,436 | 7/1994 | Sampath et al. | 203/98 |
| 5,387,322 | 2/1995 | Cialkowski et al. | 252/158 |
| 5,433,928 | 7/1995 | Haehn | 422/215 |

FOREIGN PATENT DOCUMENTS

| | | |
|---|---|---|
| 0122367 | 10/1984 | European Pat. Off. . |
| 0126288 | 11/1984 | European Pat. Off. . |

Primary Examiner—Virginia Manoharan
Assistant Examiner—Christopher Kim
Attorney, Agent, or Firm—Herbert Dubno

[57] ABSTRACT

A column for performing thermal separations and/or chemical reactions with a vertical cylindrical outer column wall surrounding an inner volume, which is subdivided by a median vertical separating wall into two volume halves, wherein mass exchange packs are arranged, whereby an overheated liquid can be introduced in the column, whereby for the separation of the overheated liquid into liquid and vapor on the separating wall a box is mounted, wherein abuts a duct traversing the outer column wall and supplying the overheated liquid, whereby the box has a mist collector in its upper region and a liquid outlet in its lower region.

5 Claims, 2 Drawing Sheets

COLUMN FOR OVERHEATED LIQUIDS

FIELD OF THE INVENTION

Our present invention relates to a column for performing thermal separations and/or chemical reactions, with a vertical, cylindrical outer column wall surrounding an inner volume which is subdivided by a median vertical separating wall (separating plate) into two volume halves wherein mass exchange packs (packings) are arranged, whereby an overheated liquid can be introduced in the column.

BACKGROUND OF THE INVENTION

It is known to separate an overheated liquid into liquid and vapor outside a column, and then to introduce them separately into the column. This is expensive from the points of view of construction and process.

OBJECT OF THE INVENTION

It is the object of the invention to create a column wherein an overheated liquid can be introduced, without having to be previously separated into liquid and vapor outside the column.

SUMMARY OF THE INVENTION

According to the invention this object is achieved by mounting a box on the separating wall for the purpose of separating the overheated liquid into liquid and vapor. A duct traversing the outer column wall and feeding the overheated liquid enters the box. The box has a mist collector in its upper region and a liquid outlet in its lower region.

The box arranged in Thu column allows the overheated liquid to be safely separated into liquid and vapor by means of a simple construction and handling. The box requires little space at a high-level of efficiency and is easily mounted.

It is particularly advantageous when the box is provided in its lower region with a liquid-collecting space from which the liquid reaches the outlet through an overflow. The overflow can be part of a syphon.

An optimal modus operandi is achieved when on the column inside and at box level, a liquid-collecting channel ending in the box is provided. It is advantageous for the box to extend lengthwise approximately over the entire width of the separating wall and for one end of the approximately semicircular liquid-collecting channel to about in each of the two box ends.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
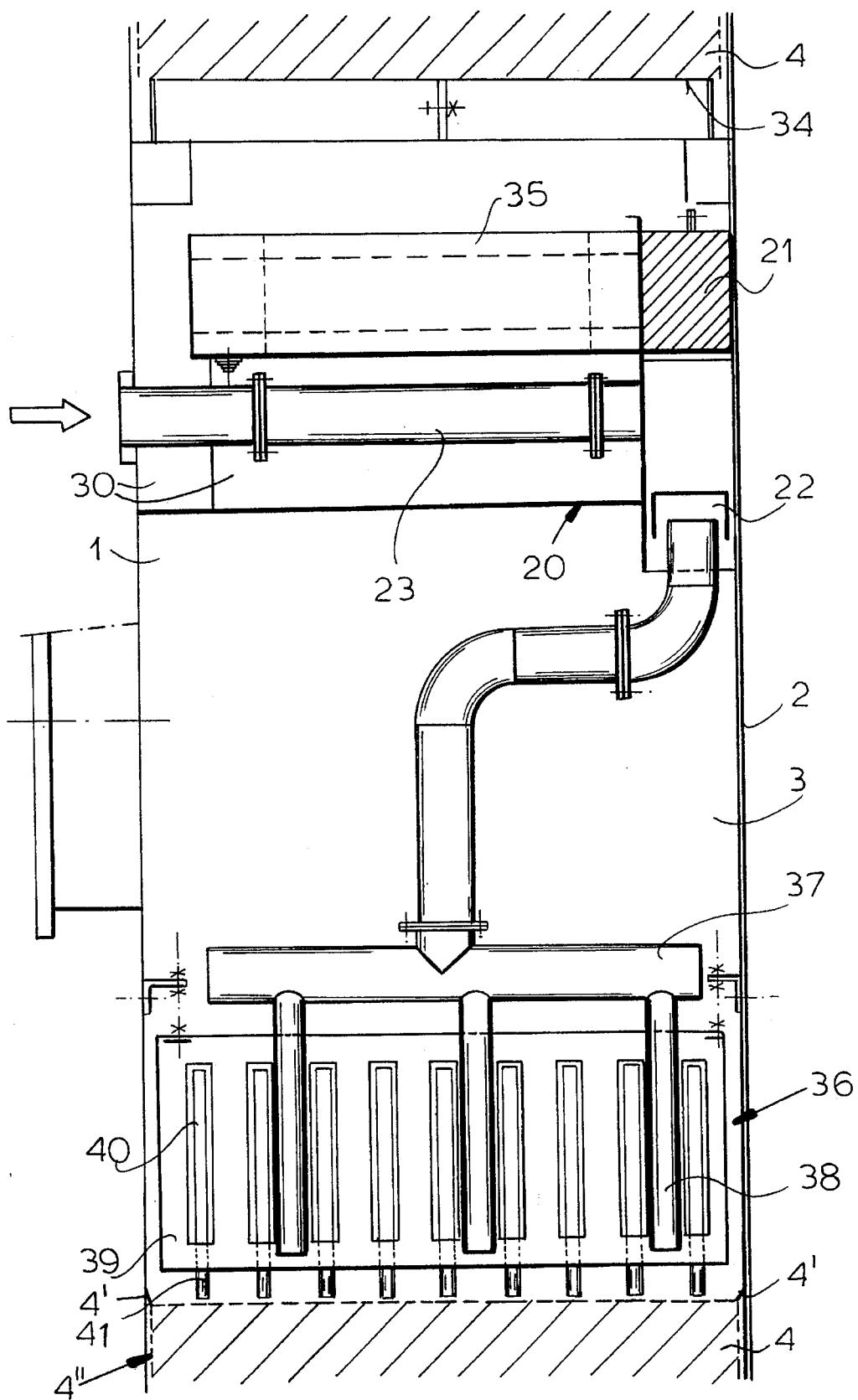
FIG. 1 is a vertical section through the column.
Figure 2:
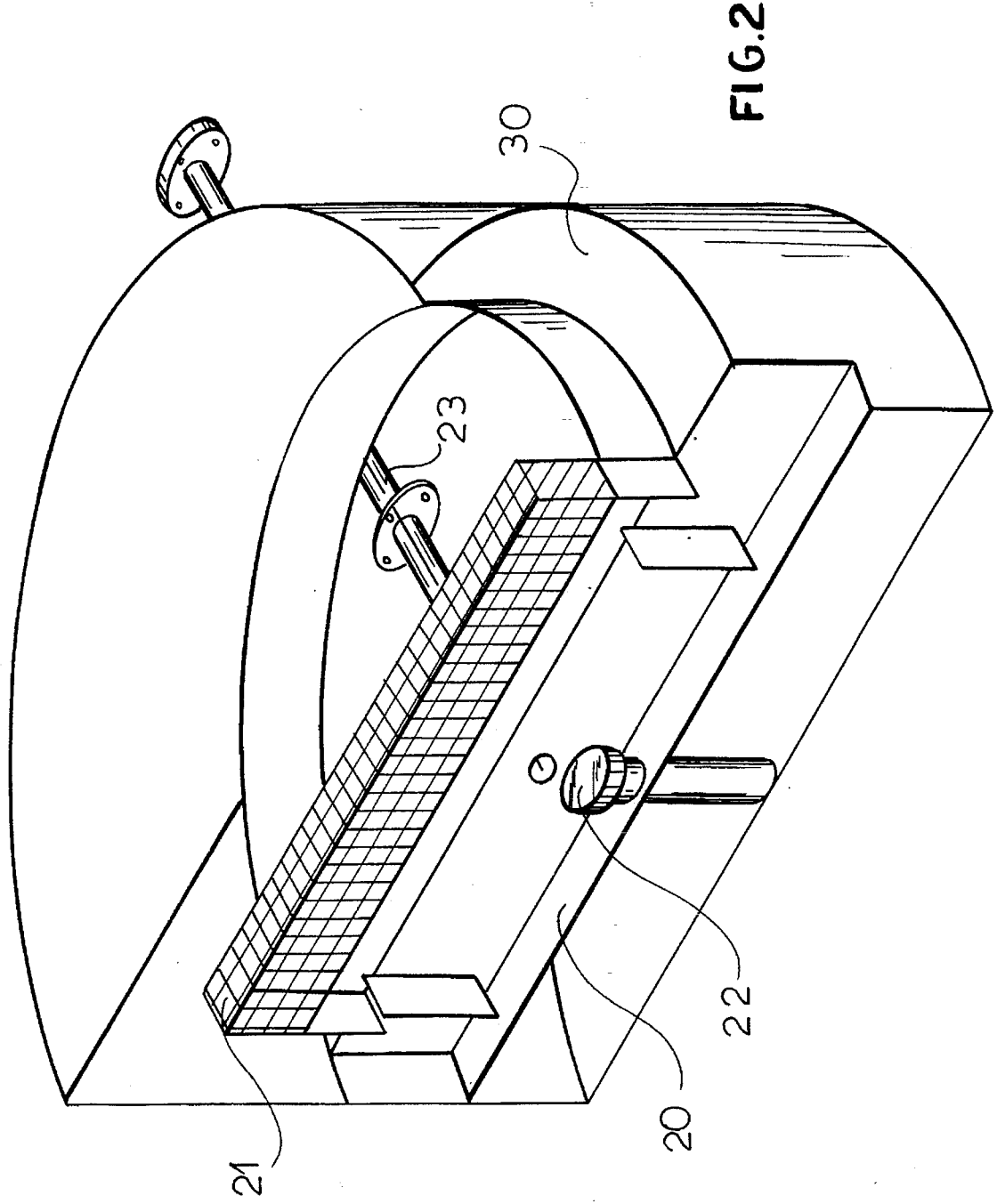
FIG. 2 is a perspective view of the box.

The column for performing thermal separations and/or chemical reactions has an outer wall 1 in the shape of a vertical cylinder. The inner volume is divided by a median, vertical, diametrically separating wall 2 into two equally large volume halves 3 and in each volume half at least one mass exchange packing 4 is arranged, whose outer peripheral side forms a well defined marginal gap 4 of approximately 3 to 30 mm with the inside of outer wall 1.

In order to prevent the liquid from flowing along the inside without reaching the mass exchange packing, on the outer side of the mass exchange packing two rim guards 4' are fastened, which guide the liquid flowing along towards the mass exchange packings.

On the one side of the separating wall 2 a box or con 20 is fastened, which has in its upper region, particularly at the upper end, a droplet-separator packing 21 and at the bottom a liquid outlet 22 with a syphon-like construction. Between the mist collector 21 and the outlet 22 is provided a feeding duct 23, through which the overheated liquid is brought into the box 20 in order to be separated there into vapor and liquid. The vapor exits upwardly through the droplet-separator packing and the liquid exits through the bottom outlet 22.

The box can have the width of the separating wall. Thereby in the box 20 end to the two end areas of the liquid-collecting channel 30, which extends horizontally in a semicircle along the inner surface of the column wall 1.

Further in FIG. 1 are shown: a grid 34 underneath the packing 4, collecting plates 35 extending laterally from the mist collector 21 and a distributor 36 underneath box 20, with a preliminary distributor pipe 37, vertical distributor pipes 38, median distributor channels 39, from where the distributor channels 40 bearing the tubes 41 start out.

We claim:

1. An apparatus for thermal separations or chemical reactions, said apparatus comprising:
    a column having an annular peripheral wall extending along a vertical axis;
    a median wall extending in a plane including said vertical axis and forming two halves in said column, each of said halves being provided with a respective mass exchange pack;
    means for delivering an overheated liquid from outside of said column and mounted on said peripheral wall and comprising:
        a housing in said column and formed with a housing wall juxtaposed with said median wall and with a segment of an inner surface of said annular wall extending from said median wall,
        duct means for introducing the overheated liquid into said housing and extending along a duct axis lying transversely to said column axis,
        a mist collector in said housing for evacuating vapor therefrom and juxtaposed with said median wall, and
        liquid outlet means spaced axially downwardly from said mist collector along said column axis for evacuating liquid from said housing toward the mass exchanger pack spaced axially downwardly from said housing.

2. The apparatus defined in claim 1 wherein said housing is provided with means forming a liquid-collecting chamber communicating with said liquid outlet means upon reaching a predetermined level of said liquid.

3. The apparatus defined in claim 2 wherein said outlet means is a syphon formed with a lower end spaced axially downwardly from said housing, an upper end of said syphon extending into said liquid-collecting chamber and a pipe connecting said upper and lower ends of the syphon.

4. The apparatus defined in claim 2 wherein said housing is provided with a semi-annular liquid-collecting channel extending laterally outwardly from said liquid-collecting chamber along said segment of said inner surface of the peripheral wall of said column.

5. The apparatus defined in claim 4 wherein said liquid collecting chamber extends approximately over the entire width of the separating wall.

* * * * *